UNITED STATES PATENT OFFICE.

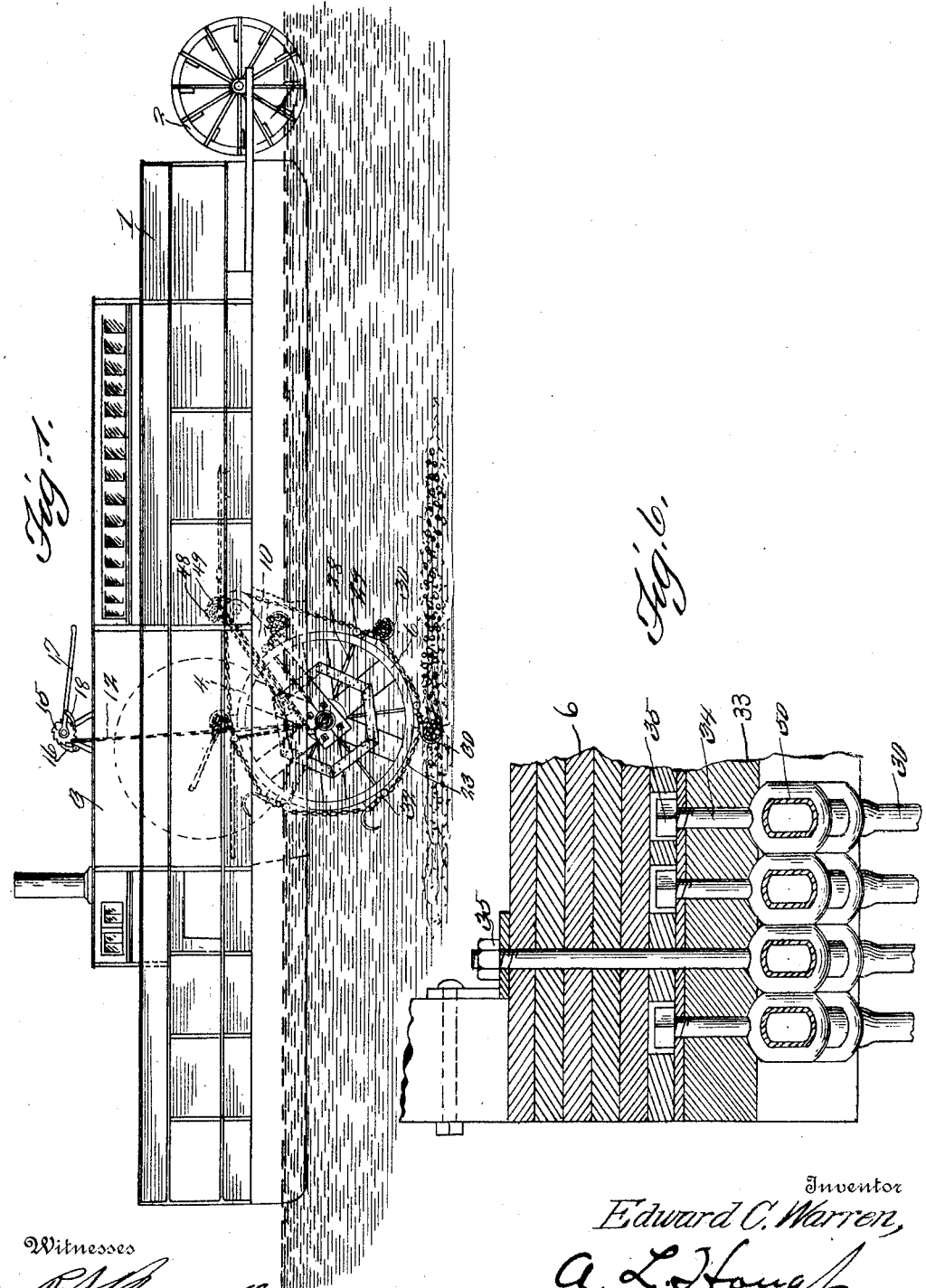

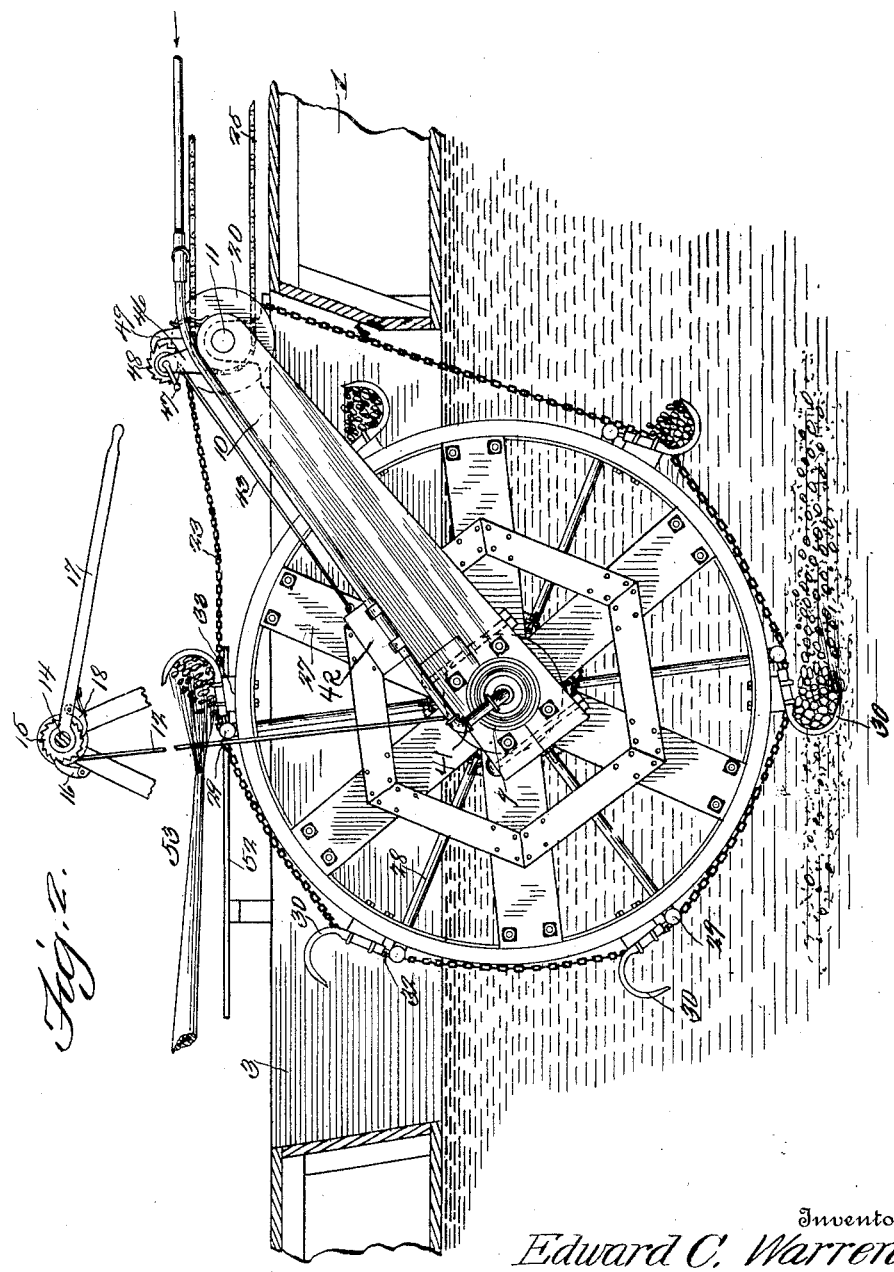

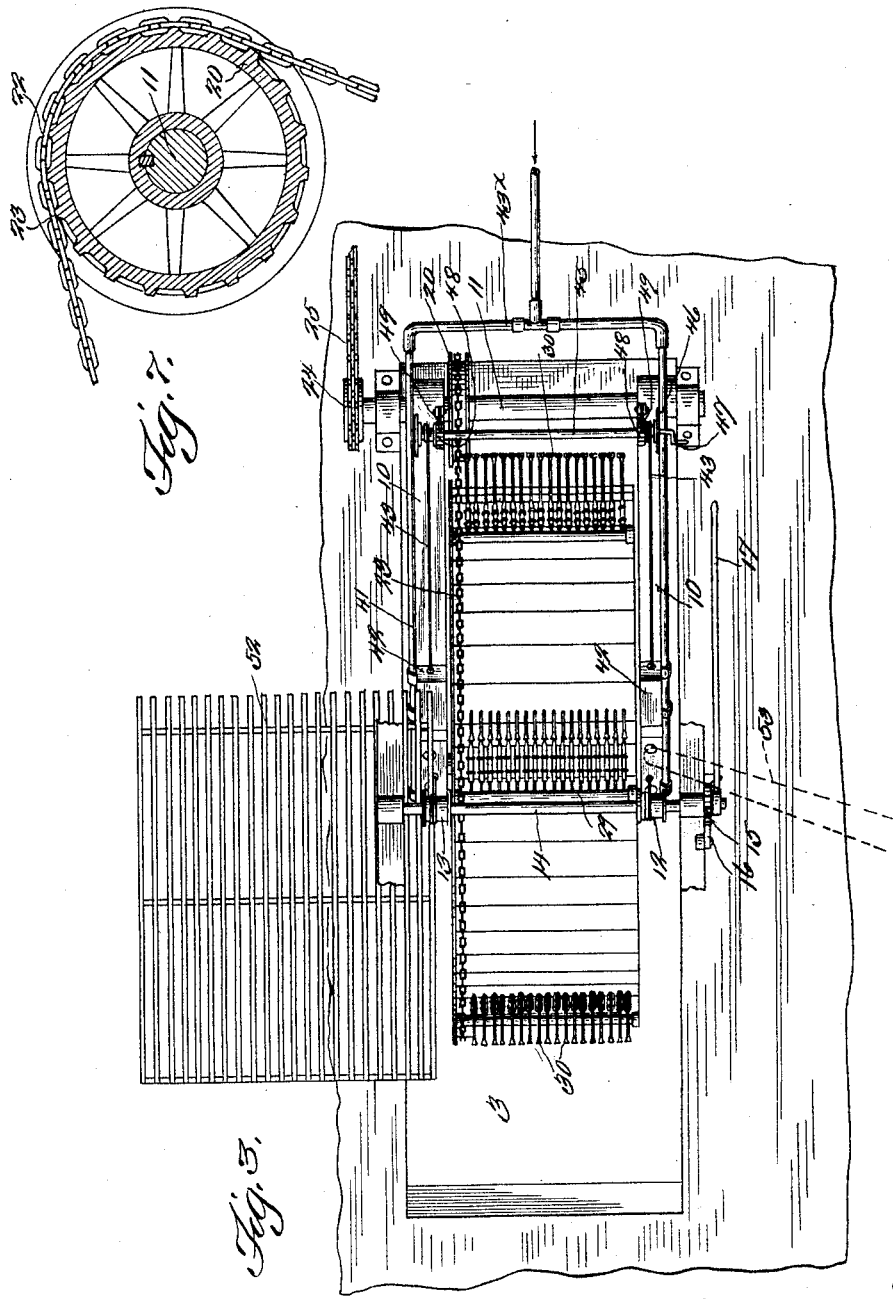

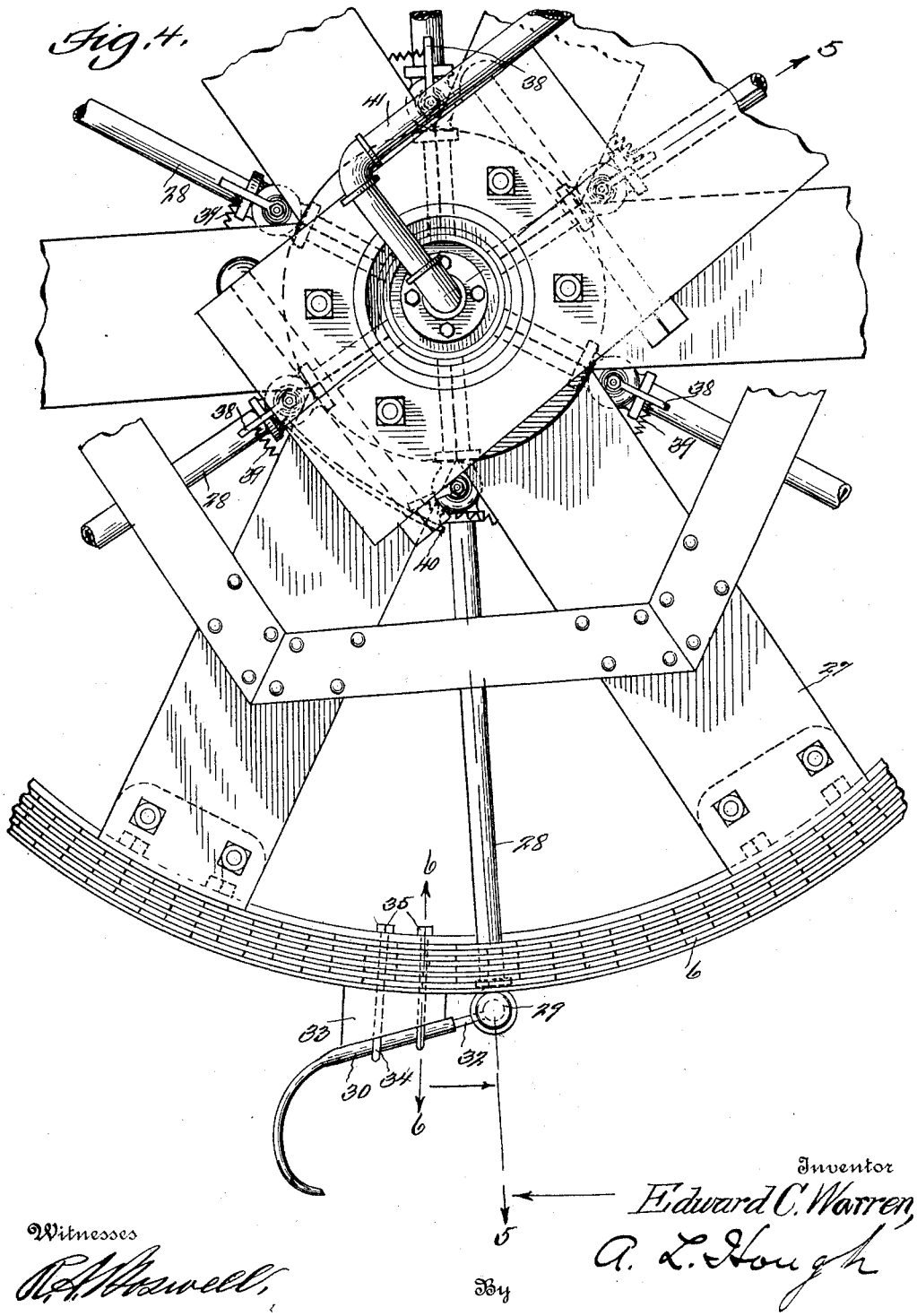

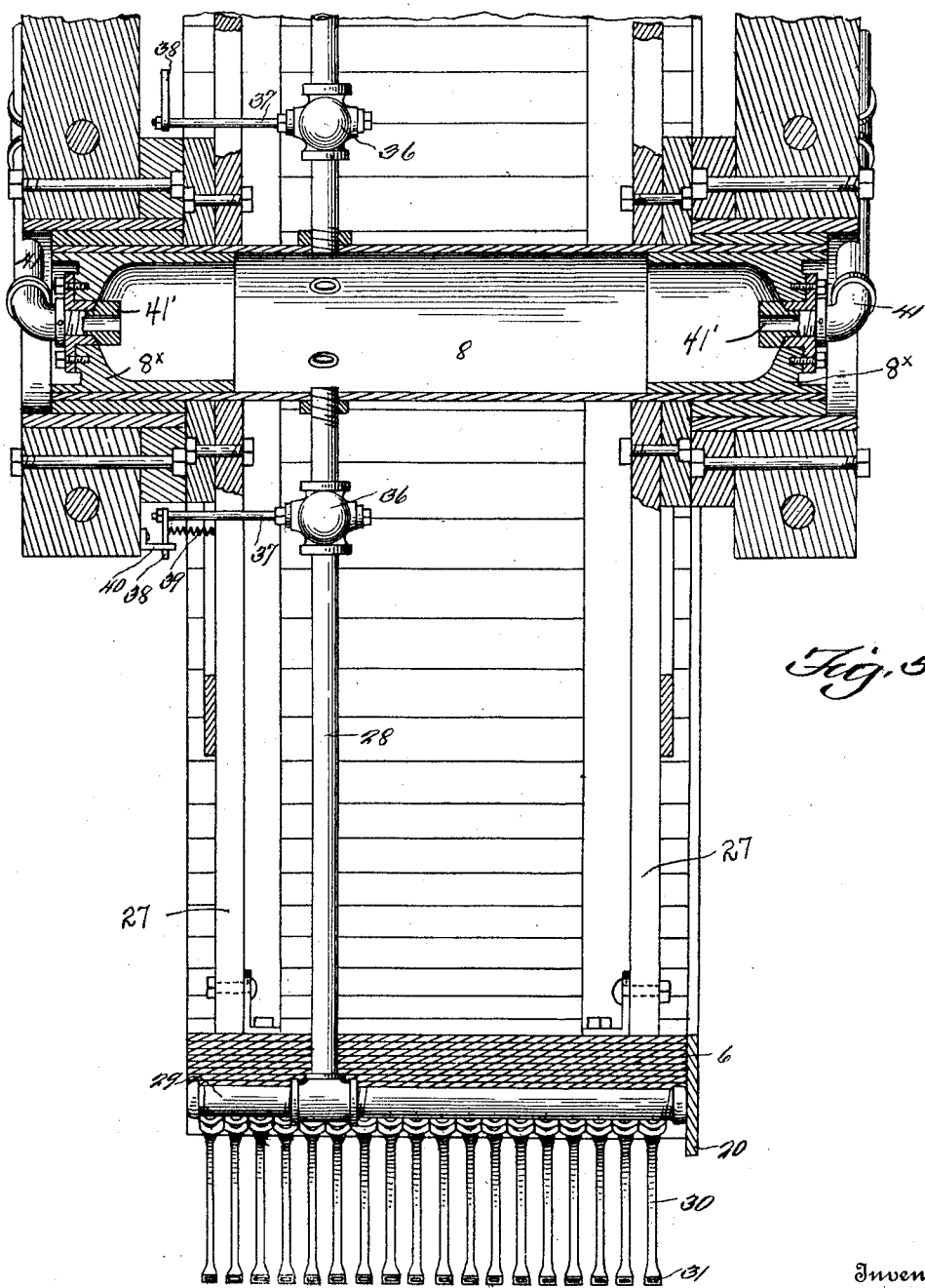

EDWARD CHRISTOPHER WARREN, OF FORT MYERS, FLORIDA.

CLAM-DREDGE.

1,318,517.  Specification of Letters Patent.  Patented Oct. 14, 1919.

Application filed January 29, 1919. Serial No. 273,837.

*To all whom it may concern:*

Be it known that I, EDWARD C. WARREN, a citizen of the United States, residing at Fort Myers, in the county of Lee and State of Florida, have invented certain new and useful Improvements in Clam-Dredges, of which the following is a specification, reference being had therein to the accompanying drawing.

This invention relates to new and useful improvements in machines for gathering clams and other shell fish from the beds of sand, gravel or the like, along the bottoms of streams or other bodies of water, and has particular reference to an apparatus movable upon the surface of the water, and having a rotatable member provided with claws or teeth arranged in series, spaced apart and adapted to scoop up clams, hydraulic means being provided to jet streams of water upon the material from which the clams are separated as they are loosened from the bed of the water and raised therefrom.

More specifically, the present invention contemplates a cylindrical rotatable member having about its circumference parallel series of hollow claws, through which water under pressure is caused to be jetted into the soil in which the clams are embedded and tending to loosen or separate the clams or other shell fish from the sand or gravel as they are scooped up, hydraulic means being provided for removing the clams from the rotatable member upon a sluice table.

My invention comprises a simple and efficient device of this nature having various details of construction, combination and arrangement of parts which will be hereinafter fully described, shown in the accompanying drawings and then specifically defined in the appended claims.

My invention is illustrated in the accompanying drawings which, with the letters of reference marked thereon, form a part of this application, and in which:

Figure 1 is a side elevation of my improved dredge.

Fig. 2 is an enlarged vertical detail sectional view through the dredge showing the rotatable member and associated parts in elevation.

Fig. 3 is a detail top plan view of a portion of the dredge.

Fig. 4 is an enlarged detail in elevation partly in section of the rotatable member carrying the claws or hooks, and illustrating in elevation the hydraulic jettying mechanism.

Fig. 5 is a sectional view taken on line 5—5 of Fig. 4 looking in the direction of the arrow.

Fig. 6 is a detail sectional view on line 6—6 of Fig. 4, and

Fig. 7 is a sectional view through the driving wheel about which the chain for operating the rotatable member passes.

Reference now being had to the details of the drawings by numeral:

1 designates a dredge in the form of a boat which in the present instance is provided with a stern propeller 2 and which boat has a vertical well 3 formed therein amidships, and in which a rotatable wheel or member 4 is mounted and which is adapted to be lowered therefrom and held in different operative positions by a mechanism which will be hereinafter described. Said wheel or carrier, which is of cylindrical form, has a periphery with a laminated circumference made up preferably of boards 6, as shown clearly in Fig. 4 of the drawings, and has a hollow cylindrical axle 8, shown in detail in Fig. 5 of the drawings, which is mounted in suitable bearings in the swinging radius beams 10, one of which is shown clearly in elevation in Fig. 2 of the drawings. Said beams are mounted to oscillate at their upper ends upon a shaft 11 mounted in suitable bearings upon the dredge at any suitable location, and 12 designates cables fastened to the radius beams one on each side of the rotatable member or wheel, and which cables pass about drums 13 fixed to the shaft 14 mounted in bearings upon either side of the well, as shown in Fig. 3 of the drawings. Fixed to said shaft 14 is a ratchet wheel 15, and 16 is a pivotal pawl engaging the teeth thereof, while 17 designates a lever pivotally mounted upon the shaft 14 and carries a pivotal pawl 18 which is adapted to engage the teeth of said ratchet wheel for the purpose of rotating the same when it is desired to elevate the radius beams in which the rotatable wheel or member is mounted, according as it may be desired to adapt the apparatus for digging clams or other shell fish in the water at different depths. Fixed to rotate with the shaft 11 is a driving wheel 20, shown in Fig. 3 of the drawings, a detail of said wheel being shown in section in Fig. 7, and which has a series of depressions 21 in its circumference designed to receive alternately disposed vertical links 22 of the driving chain 23 as they pass about the driving wheel. The shaft 11 is driven from any suitable source of power applied through the driving chain 25 which passes about the pulley 24, shown in Fig. 3 of the drawings.

Said chain 23 passes about the rotatable wheel or member 3 at any suitable location about its circumference, preferably near one side thereof, as disclosed in Fig. 3 of the drawings, and forms a suitable means whereby the wheel may be rotated at a desired speed. Said rotatable member or wheel 3 is provided with a series of radial spokes 27, six of the same being shown in the drawings, and intermediate the several spokes are pipes 28 which at their inner ends communicate with the hollow cylindrical hub or axle 8, as shown in Fig. 5 of the drawings, and at their outer ends communicate with the cross pipes 29 to which a series of hollow claws or hooks 30 are connected through the medium of the flexible tubes 32, shown in Fig. 4 of the drawings. Said tubes 32 being flexible will relieve the pipes, through which the water is conveyed from the central hollow axle to the fingers, from unnecessary vibration incident to the claws dragging through the clams and material in which they are embedded. Said claws are provided with nozzle ends 31 (see Fig. 5) and through which water under pressure is adapted to be jetted at a predetermined moment in the rotary movement of the wheel for the purpose hereinafter described. Said hooks or claws are securely fastened to the outer inclined edges of the blocks 33 which are held by the eyebolts 34 to the laminated circumference of the wheel by means of nuts 35. Upon reference to Fig. 6 of the drawings, it will be noted that the walls of the hollow claws or hooks are flattened as at 50 and that the eyes of the bolts 34 also have flattened portions corresponding therewith and which are so formed for the purpose of securely holding the hooks or claws from turning.

Each of the pipes 28, as shown in Fig. 5 of the drawings, is provided with a valve casing 36, having a valve therein the stem 37 of which has fixed thereto an arm 38 to which one end of a coiled spring 39 is fastened, which in turn is secured to a spoke 27, the purpose of said spring being to close the valve after the same has been opened by the arm coming in contact with one end of the curved segment member 40, shown in dotted and solid lines in Fig. 4 of the drawings, and in end view in Fig. 5. Said segment member 40 is of such a length as to cause the valve to be kept open during the interval immediately before the claws or hooks come in contact with the sand or gravel in which the clams are embedded and after the clams are gathered by the hooks and commenced to be elevated by the wheel, and during which interval water is jetted through the nozzle ends of the hooks for the purpose of loosening the clams and other shell fish from the sand in which they are located.

Water is conveyed to the hollow axle or shaft of the wheel through the pipes 41 at opposite ends thereof, as shown in Figs. 3 and 5 of the drawings, which are connected to flexible pipes 43* and through which water may be supplied under suitable pressure to obtain the desired results.

Referring to Fig. 2 of the drawings will be seen a weight 42, there being one mounted upon each of the radius beams as shown in Fig. 3, and which are movable relative to the beams to cause the wheel to impart varying pressures to the series of claws or hooks when digging through the sand or soil in gathering clams, etc. Said weights have cables 43 fastened thereto and which wind about a shaft 45 which is journaled in the bracket arms 46 and to which shaft 45 a handle 47 is fastened and also ratchet wheels 48 engaged by pivotal pawls 49 for holding the weights at different elevations upon the radius beams.

After the wheel or member 43 has raised the clams to a desired elevation, they are removed therefrom on to a sluice plate 52, shown in Figs. 2 and 3, by means of a stream of water directed across the series of teeth through the medium of the nozzle 53, thus delivering the clams free from soil in readiness to be transferred to bins or other places of storage.

In operation, the dredge is adapted to be given a backing up or rearward motion by power applied to the stern propeller, and the wheel having the series of claws or hooks thereon given a rotary movement through the medium of the chain belt 23, in the same direction as the travel of the dredge and at the desired speed. As a series of claws or hooks approach the sand or soil in which the clams or other shell fish are embedded, an arm regulating the valve within the casing 36, as it comes in contact with one end thereof, will cause the valve to open and permit water under pressure to flow through the pipe 28 and be forcibly jetted out through the nozzle ends of the hollow claws or hooks and into the soil, thus loosening the sand or soil about the clams as they are about to be scooped up. This jetting action of the water through the claws will continue until the clams are separated from the bottom and about to be elevated. When the arm 38 passes by the end of the segment 40 the spring 39 will return the valve stem 37 to its normal position closing the valve and shutting off the supply of water forced through that particular pipe.

This operation is repeated each time a series of claws or hooks approaches the bed of the body of water, it being noted that the water under pressure is jetted only when the hooks or claws are adjacent to the bottom of the bed of the stream or body of water. When a series of hooks elevates the clams slightly above the sluice table 52 they are removed from the hooks by a strong current of water directed against the same.

What I claim to be new is:

1. An apparatus for dredging clams, etc., including a rotatable member, claws thereon, and means rotating with said member for conveying water under pressure for jetting streams of water against the clams and material in which they are embedded.

2. An apparatus for dredging clams, etc., including a rotatable member, claws thereon, and means rotating with said member for conveying water under pressure, and means for automatically releasing the latter to be jetted against the clams and material in which they are embedded.

3. An apparatus for dredging clams, etc., including a rotatable member, claws thereon, pipes rotating with said member, and means for permitting water to be jetted intermittently through said claws and against the clams and material in which they are embedded.

4. An apparatus for dredging clams, etc., including a rotatable member, hollow claws mounted thereon, and means for jetting water through said claws against the clams and material in which they are embedded.

5. An apparatus for dredging clams, etc., including a rotatable member, hollow claws mounted thereon, and means for intermittently jetting streams of water through said claws against the clams and material in which they are embedded.

6. An apparatus for dredging clams, etc., including a rotatable member, hollow claws arranged in series about the circumference thereof, and means for jetting streams of water intermittently through the claws as they approach and come in contact with the material to be dredged.

7. An apparatus for dredging clams, etc., comprising a rotatable member, vertically adjustable means in which the member is mounted, and means rotating with said member for jetting streams of water against the clams and material in which they are embedded.

8. An apparatus for dredging clams, etc., comprising a rotatable member, vertically adjustable means in which the member is mounted, and means rotating with said member for jetting streams of water against the clams and material in which they are embedded.

9. An apparatus for dredging clams, etc., comprising a rotatable member, hollow claws thereon, and means for jetting streams of water through said claws against the clams as they are about to be loosened from the soil in which they are embedded, and independent hydraulic means for directing streams of water against the clams after they have been elevated out of the water and for removing the same from the clams.

10. An apparatus for dredging clams, etc., including a rotatable member, a series of hollow claws mounted thereon, pipe connections with the claws and through which water under pressure is forced to cause streams of water to be jetted through the claws as they approach the clams and material in which they are embedded.

11. An apparatus for dredging clams, etc., comprising a floating body having a well therein, a rotatable member mounted to have a vertical adjustment within said well, hollow claws fixed to the circumference of said member, and means for jetting streams of water through the claws as they approach the clams and material in which they are embedded.

12. An apparatus for dredging clams, etc., including a floating member with a well therein, a rotatable member movable within said well, and adjustable pivotal beams in which said member is mounted, weighted means upon said beams, hollow claws fixed to said member, and means for jetting streams of water through said claws and against clams as the claws approach the material being dredged.

13. An apparatus for dredging clams, etc., including a floating member with a well therein, adjustable swinging radius beams, a rotatable member journaled in said beams, hollow claws fixed to the circumference of said member, and means rotating with said member for jetting streams of water against the clams as they are being dredged.

14. An apparatus for dredging clams, etc., comprising a floating body with a well therein, adjustable radius beams mounted to swing within the well, movable weights mounted upon said beams, and means for fastening the weights, a rotatable member mounted in said beams, hollow claws fixed to the circumference of said member, and means for jetting streams of water through the claws while the clams are being dredged.

15. An apparatus for dredging clams, etc., including a floating member with a well therein, adjustable swinging radius beams mounted upon said body and movable within said well, a member having a hollow shaft journaled in said beams, branching pipes leading from said hollow shaft, series of hollow claws about the circumference of said member and communicating with said pipes, stationary means adapted to actuate said valves at a predetermined moment as said member rotates permitting streams of water to be jetted through the claws as the clams are being dredged.

16. An apparatus for dredging clams, etc., including a floating member with a well therein, adjustable swinging radius beams mounted upon said body and movable within said well, a member having a hollow shaft journaled in said beams, branching pipes leading from said hollow shaft, and having stemmed valves therein, arms fixed to said stems, a stationary segment member in the paths of said arms adapted to open the valve at predetermined moments, springs for closing the valves, hollow claws fixed to the circumference of said member, and having flexible tubular connections with said pipes.

17. An apparatus for dredging clams, etc., comprising a floating body with a well therein, adjustable radius members mounted upon said body and movable within said well, a rotatable member having a hollow axial shaft, pipes communicating therewith and through which water is introduced into the shaft, valved pipes leading from the hollow shaft, claws arranged in series about the circumference of said member and communicating with said valved pipes, and means for permitting water to be jetted through said claws at pre-determined moments in the rotary movement of said member for the purpose of loosening the clams and soil in which they are embedded while being dredged.

18. An apparatus for dredging clams, comprising a floating body with a well therein, adjustable radius beams mounted upon said body and movable within said well, a vertical rotatable member having a laminated circumference journaled in said beams and having a hollow shaft, a series of hollow claws having flattened shank portions, bolts engaging said laminated circumference of the rotatable member and having eyes with flattened portions, engaging the flattened parts of said claws, and pipes communicating between the claws and hollow shaft.

19. An apparatus for dredging clams, etc., consisting of a floating body with a well therein, radius beams and shaft upon the body upon which the same are pivotally mounted, a driving wheel fixed to said shaft, a cylindrical rotatable member journaled in the swinging ends of said beams, and having a hollow shaft adapted to receive water under pressure, pipes leading from said hollow shaft, hollow claws fastened to the circumference of said member and communicating with said pipes, endless driving chain passing about said member and driving wheel, and means for permitting water to be jetted through the claws intermittently during the rotary movement of said member.

In testimony whereof I hereunto affix my signature in presence of a witness.

EDWARD CHRISTOPHER WARREN.

Witness:
A. L. Hough.

Copies of this patent may be obtained for five cents each, by addressing the "Commissioner of Patents, Washington, D. C."